Patented Oct. 3, 1939

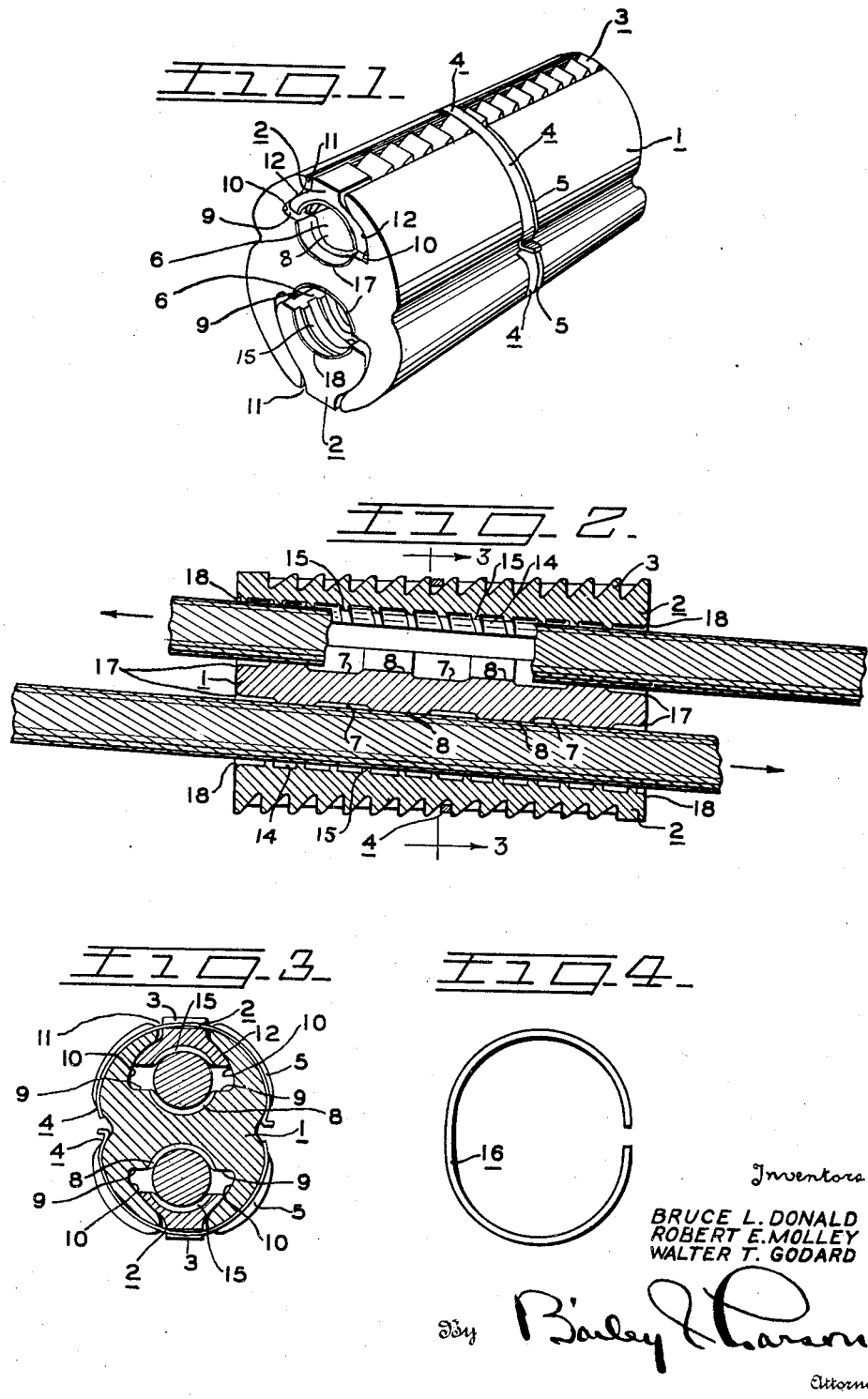

2,174,624

UNITED STATES PATENT OFFICE 2,174,624

CABLE CLAMP

Bruce L. Donald, Sanborn, Robert E. Molley, Buffalo, and Walter T. Godard, Kenmore, N. Y., assignors to Eureka Metal Products Corporation of New York, a corporation of New York Application December 2, 1938, Serial No. 243,674

9 Claims. (Cl. 287—78)

This invention relates to cable clamps and in particular to the provision of self-energizing or self-setting cable clamps.

It is an object of the invention to provide a cable clamp which is adapted, particularly, for ease of attachment between cable portions which are stressed oppositely or in different directions and wherein the stress or tension in the cable portions is utilized to set or tighten the clamp wedges automatically.

It is a further object of this invention to provide, in such constructions, means operative automatically to lock or latch the clamp wedge means against recession while permitting further setting or tightening thereof freely under the influence of cable tension or stress.

It is a further object to provide, in such constructions, a body portion having relatively movable therein wedge means having the cable engaging surface thereof provided with helical grooves and intermediate ridges of pitch differing from the pitch of cables engaged thereby.

It is a further object of this invention to provide, in such constructions, groove and ridge means in the clamp body, the pitch thereof differing from the pitch of the cable and also the grooves and ridges in the wedge means for the prevention of undesirable displacement of the cable therebetween by "screw" action.

It is a further object of this invention to provide, in such constructions, deeper grooves and higher ridges in the cable engaging surface of the wedge means than in the cable engaging surface of the body portion whereby the application of tension to a cable clamped therebetween will cause greater slippage between the cable and body portion than between the cable and wedges and thus cause self-energization or self-setting of the wedges.

It is a further object of this invention to provide, in such constructions, ratchet lock means between the wedge and body means comprising a ratch or ratchet member in the form of a toothed or notched bar which is slidable with respect to resilient bail means cooperating with the teeth or notches therein, as a pawl.

These and other objects and advantages will appear from the following description taken in connection with the drawing:

In the drawing:

Fig. 1 is a view in perspective of a cable clamp constructed according to the principles of this invention;

Fig. 2 is a view in central vertical section of the structure shown in Fig. 1;

Fig. 3 is a section taken on the line 3—3 of Fig. 2; and

Fig. 4 is a view in elevation of a modified form of bail adapted for use in the structure shown in Figs. 1 to 3 inclusive.

Referring to the drawing, in detail, it will be seen that the cable clamp comprises a body member 1 having slidably therein, in opposite directions, a pair of wedge members 2, which wedge members are each provided with a notched or toothed ratch or rack member 3 having the teeth thereof engaged by bail means 4 which is resiliently clamped in suitable groove means 5 disposed centrally of the length of the body member 1.

As shown particularly in Figs. 1, 2 and 3, the means for slidably receiving the wedge members 2 comprises a pair of recesses similar, though oppositely disposed, which terminate inwardly in parallel arcuate grooves 6, which are in turn provided, in the interest of friction, with shallow helical grooves 7 and intermediate ridges 8 adapted to engage the cable and having a pitch different from and preferably less than the pitch of the cable.

The arcuate grooves 6 terminate outwardly in a flat, trapezoidal surface forming guide steps 9 at opposite sides of each groove 6. Extending outwardly from each guide step 9 is a frustoconical interior surface 10 which terminates at the axial slot 11, which is preferably of such width as to permit free and convenient insertion of the cable in the recesses.

The wedges 2, which are similar, are provided with exterior surfaces 12 at each side which are complementary with the interior surfaces 10 of the body member 1, whereby movement of each wedge member 2 with respect to the body member 1 will cause inward movement thereof with respect to the arcuate groove 6 in one direction and outward movement thereof with respect to the arcuate groove 6 in the other direction. The inwardly directed surface of each wedge member 2 is provided with deep, helical grooves 14 and intermediate, sharp ridges 15, the pitch of which is different from that of the cable engaged thereby.

Formed integrally with each wedge member 2 is the above-described ratchet or toothed rack member 3 which extends outwardly through the axial slot 11 as shown in Fig. 3 in such manner that the spaces between the teeth thereof are substantially adjacent the groove 5 in such manner that accidental withdrawal of the wedges is prevented, while the camming action of the teeth against the bail 4 will permit further setting of the wedge member 2 at all times.

The toothed rack members 3 cooperate with the slots 11 to guide the wedge members 2 in their movement axially of the body member 1, while the complementary frusto-conical surfaces 10 and 12 are the bearing surfaces between the wedges and the body member.

As shown in Figs. 1, 2 and 3, each groove 5 is provided with a separate resilient bail member 4 which is generally semicircular. However, as an alternative, a single bail member 16 (Fig. 4) may be substituted therefor. This member 16 may be formed of resilient material of rectangular section or may be formed of wire stock having suitable properties. Each form of bail member shown operates as a yielding snap ring and cooperates with the teeth of the ratchet member 3 to permit free advance of the respective wedge members 2 toward locking engagement, while preventing recession thereof at all times.

The difference between the pitches of grooves 7 and 14 and ridges 8 and 15 and the pitch of the strands in the cable clamped therebetween prevents the cable from reacting, under tension, as a screw in a nut and unwinding itself from the cable clamp to release the tension in the cable.

As shown in Fig. 2, the body member 1 of the cable clamp is snapped between a pair of cable portions tensioned in the direction indicated by arrows on the cable in that figure. This is readily done by slipping the cable portions through the respective axial slots 11 into the recesses in the body member 1 and thereafter sliding in the wedge members 2. These members are preferably pressed into the desired position after bails 4 or bail 16 have been inserted in the grooves 5. Thereafter release of the cable portions will cause them to urge the wedge members 2 in the direction of their stress, as indicated by arrows, to further lock the wedge members 2 with respect to the body member 1 and also with respect to the cable portions due to the digging in of the ridges 15 of the wedge members 2 into the cable portions.

As shown in Figs. 1 and 2, the arcuate grooves 6 terminate in bevelled end surfaces 17 and like-bevelled surfaces 13 are provided at the ends of the wedge members 2 to prevent injury to the cable portion therein.

Preferably, and as shown, the pitches of the grooves 7 and 14, in addition to differing from the pitch of the strands in the clamped cable, differ also from one another as do the intermediate lands or ridges 8 and 15; this difference in pitch absolutely prevents accidental displacement of the cable by reason of "screw" action as will be readily understood, the difference in the pitches producing such binding upon application of rotary stress in the cable as to prevent relative rotation between the cable and the clamp as a whole.

The ridges or lands 15 are preferably of sufficient sharpness and narrowness as to permit them to bite into the cable while the broadness of the lands or ridges 8 prevents such biting into the cable.

The action of the lands or ridges 15 in biting into the cable causes the transmission of cable tension to the wedge members 2 as axial setting force whereby to make the wedge members self-setting and the cable clamp self-energizing.

The grooves 7 and lands or ridges 8 may be omitted, if desired, without substantial impairment of the efficiency of the clamp, their omission, on the contrary, increasing the degree of wedge setting force exerted through cable stress.

The toothed rack members 3 in their engagement in the slots 11 act as keys integral with the wedge members and thus perform a wedge member guiding function in addition to their cooperation with the bails 4 (or bail 16) in the grooves 5 as one-way, or ratchet, wedge locking or latching means.

The frusto-conical bearing surfaces 10 and 12 provide a high degree of camming of the wedges with minimum tendency toward binding between wedges 2 and body member 1.

In addition to the above advantages, the cable clamps may be readily and completely salvaged due to the ease of removal of the bail means and the responsiveness of the wedges to stress conditions in the cable as well as the accessibility of the wedges to the application of exterior unsetting forces.

The advantages above described are by no means interdependent, it being possible, for instance, to achieve the advantages of my invention by the provision of a single wedge and recess in the body member or by the provision of any desired greater number.

Likewise, the bail means may be omitted and a wire secured in grooves 5 with its ends secured together, as by twisting.

It is, of course, to be understood that the above described structure which is illustrated in the drawing is susceptible to variation within rather wide limits and that we desire to comprehend within our invention such modifications as come within the scope of the claims and the invention.

Having thus fully described our invention, what we claim as new and desire to secure by Letters Patent is:

1. In a cable clamp, relatively slidable wedge and body members having engaging cam surfaces, and cooperating means on said wedge and body members for latching said wedge and body members against relative sliding movement in one direction, said cooperating means comprising ratchet means on said wedge member and cooperating pawl means on said body member.

2. In a cable clamp, a body member having therein a recess with inclined wall surfaces, a wedge member slidable in said recess and having surfaces engaging said inclined wall surfaces and complementary therewith, slot means in said body member communicating with said recess, toothed rack means on said wedge member slidable in said slot means for guiding said wedge member, and means cooperating with said toothed rack means for latching said wedge member against movement in said recess in one direction.

3. Structure according to claim 2, said means cooperating with said toothed rack means comprising a bail member detachably secured on said body member and resiliently engaging the teeth of said toothed rack means.

4. Apparatus according to claim 2, said slot communicating with said recess and the exterior of said body member being of width greater than the diameter of cables adapted to be clamped in said cable clamp to provide for insertion of said cables through said slot into said recess.

5. In a cable clamp, a body member having therein a recess with inclined wall surfaces and adapted to receive a cable, a wedge member slidable in said recess and having surfaces engaging said inclined wall surfaces, slot means in said body member communicating with said recess and having parallel sidewalls, means on said wedge member having parallel surfaces engaging the sidewalls of said slot means for guiding said wedge member longitudinally in said recess, and means cooperating with the last-named means for latching said wedge member against movement in said recess in one direction while permitting movement thereof in the opposite direction.

6. In a cable clamp, a body member having therein a pair of spaced recesses with inclined wall surfaces and adapted to be receive cable portions, the inclined wall surfaces of said recesses being oppositely disposed, a pair of wedge members each slidable in one of said recesses and having surfaces engaging said inclined wall surfaces, a pair of slots in said body member each communicating with one of said recesses, means on each wedge member engaging one of said slots for guiding said wedge members slidably in said recesses, and means cooperating with said last named means for latching each of said wedge members against movement in one direction while permitting movement thereof in the opposite direction.

7. In a self-energizing cable clamp, a body member having therein a cable-receiving recess with a cable engaging groove, a wedge member slidable in said recess clampingly toward said first named cable engaging groove by cable stress and having a cable engaging groove parallel with said first-named cable engaging groove and cooperating therewith to clamp a cable portion therebetween, narrow, sharp helical ridges in said last-named cable engaging groove and wide, flat helical ridges in said first-named cable engaging groove, the pitches of said ridges differing from the pitch of the strands of cables adapted to be clamped therebetween and from each other for preventing screw action between said cable clamp and a tensioned cable portion clamped therein, and said narrow, sharp ridges being adapted to dig into a cable to translate tension in said cable into sliding setting movement of said wedge member in said body member whereby said cable clamp is self-energizing.

8. A new article of manufacture for use as a cable clamp wedge comprising a member having a cable engaging groove with sharp narrow lands therein of pitch different from the pitch of cable strands to be engaged thereby, cam surfaces on said member engageable with complementary surfaces in a clamp body member, a key member integral with said member, and teeth on said key member adapted for engagement with latching means on said clamp body member.

9. A cable clamp comprising a body member having oppositely slidable therein a pair of clamp wedge members, toothed rack members integral with each wedge member, the groove means on said body member transverse with respect to said toothed rack means, and a single bail member in said groove means encircling the teeth of said rack means and cooperating therewith to prevent recession of said wedge members with respect to said body member.

BRUCE L. DONALD.
ROBERT E. MOLLEY.
WALTER T. GODARD.